United States Patent [19]

Yoshiyama

[11] Patent Number: 5,621,383
[45] Date of Patent: Apr. 15, 1997

[54] RING NETWORK SYSTEM CAPABLE OF DETECTING AN ALARM IN EACH NODE

[75] Inventor: Shunji Yoshiyama, Tokyo, Japan

[73] Assignee: NEC Corporation, Tokyo, Japan

[21] Appl. No.: 628,194

[22] Filed: Apr. 5, 1996

Related U.S. Application Data

[63] Continuation of Ser. No. 261,185, Jun. 13, 1994, abandoned.

[30] Foreign Application Priority Data

Jun. 11, 1993 [JP] Japan .................................... 5-140556

[51] Int. Cl.$^6$ .............................. G08B 29/00; H04J 3/00
[52] U.S. Cl. ......................... 340/506; 340/531; 340/508; 340/825.05; 370/245
[58] Field of Search ..................... 340/506, 531, 340/555, 508, 825.06, 825.11, 825.29, 825.05; 370/16.1; 359/143, 152, 174, 164, 125

[56] References Cited

U.S. PATENT DOCUMENTS

| | | | |
|---|---|---|---|
| 4,041,470 | 7/1977 | Slane et al. | 340/525 |
| 4,596,982 | 6/1986 | Bahr et al. | 340/825.06 |
| 4,673,920 | 6/1987 | Ferguson et al. | 340/521 |
| 4,682,144 | 7/1987 | Ochiai et al. | 340/505 |
| 4,752,899 | 6/1988 | Newman et al. | 364/550 |
| 4,812,820 | 3/1989 | Chatwin | 340/518 |
| 5,150,243 | 9/1992 | Suzuki | 340/531 |

FOREIGN PATENT DOCUMENTS

| | | |
|---|---|---|
| 6416146 | 1/1989 | Japan . |
| 6489636 | 4/1989 | Japan . |

OTHER PUBLICATIONS

"Synchronous Optical Network (SONET) Transport Systems: Common Generic Criteria", Technical Advisory, TA–NWT–000253 Issue 6, Sep. 1990.
"SONET Add–Drop Multiplex Equipment (SONET ADM) Generic Criteria: A Undirectional, Dual–Fed, Path . . . " Technical Reference TR–TSY–000496, Issue 2, Sep. 1989, Supplement 1, Sep. 1991.

*Primary Examiner*—Donnie L. Crosland
*Attorney, Agent, or Firm*—Sughrue, Mion, Zinn, Macpeak & Seas

[57] ABSTRACT

In a ring network system formed by a plurality of nodes connected to one another through a ring-shaped path, each of the nodes collects all of node information signals representative of states of the nodes and memorizes the node information signals in a node information signal memory included in each node. The node information signal is periodically transmitted to each node from an adjacent one or ones of the nodes through the ring-shaped path and is renewed from time to time. Such collection of all of the node information signal in each node makes it easy to check an alarm by a superintendent.

20 Claims, 3 Drawing Sheets

RING NETWORK SYSTEM CAPABLE OF DETECTING AN ALARM IN EACH NODE

This is a Continuation of Application Ser. No. 08/261,185, filed Jun. 13, 1994 (abandoned).

BACKGROUND OF THE INVENTION

This invention relates to a ring network comprising a plurality of nodes and to a method of collecting node information signals from the respective node stations in each node station.

A wide variety of ring networks have been proposed each of which comprises a plurality of nodes connected in a ring shape through a communication path, such as an optical path. Such ring networks have been disclosed in Japanese Unexamined Patent Publications Nos. 64-16,146 (16,146/1989), 64-89,636 (89,636/1989), and the like. In the ring networks disclosed in the above-references, communication among the nodes is made by the use of a token or by a polling operation. Such communication may be either unidirectional or bidirectional communication.

In addition, a synchronous optical network (SONET) transport system has been disclosed by Bellcore (Bell Communications Research) in TA-NWT-000253 and TR-TSY-000496 issued September 1990 and September 1991, respectively. In the TA-NWT-000253, generic operations requirements are defined in connection with the SONET transport system. On the other hand, generic criteria are described in the TR-TSY-000496 as regards SONET Add-Drop Multiplex Equipment which is operable in accordance with alarm surveillance requirements mentioned in the TR-TSY-000496.

At any rate, communication should be made among the nodes by indicating a destined node or nodes on transmitting information from a transmission one of the nodes. Let a specific one of the nodes collect or gather information transmitted from each of the nodes. In this event, the information should be often transmitted from each of the nodes to the specific node through an intermediate node or nodes allowing the information to pass therethrough.

Herein, it often happens that a fault takes place somewhere on the communication path in the SONET system and should be located in the SONET system by checking status information in the nodes one by one by a superintendent. Such checking and locating the fault is very troublesome, laborious, and time-consuming because the superintendent should go to positions at which the nodes are located and should thereafter check whether or not each of the nodes is normal.

SUMMARY OF THE INVENTION

It is an object of this invention to provide a ring network which is capable of readily monitoring an alarm by a superintendent.

It is another object of this invention to provide a method which can readily locate a fault in the ring network and which can save labor, costs, and time necessary for checking all of the nodes included in the ring network.

It is still another object of this invention to provide a method of the type described, which can monitor the alarm in all of the nodes by watching only one of the nodes.

Herein, if node information signals of all of the nodes can be watched in each of the nodes by a superintendent, it might be possible to effectively save labor and time of the superintendent.

Taking this into consideration, the gist of this invention resides in collecting the node information signals of all the nodes in each of the nodes.

A ring network system to which this invention is applicable comprises a plurality of nodes which are connected in a ring shape to a ring-shaped path. According to an aspect of this invention, each of the nodes comprises node information signal producing means for producing a node information signal representative of a state of each of the nodes, receiving means connected to the ring-shaped path for successively receiving the node information signals of the other nodes from adjacent one of each of the nodes through the ring-shaped path, a node information signal memory which memorizes the node information signals, and memory control means for controlling the node information signal memory to make the node information signal memory memorize the node information signal of each of the nodes together with the node information signals sent from the other nodes.

According to another aspect of this invention, a method is used in the ring network system to collect, in each of the nodes, node information signals sent from the plurality of the nodes. The method comprises the steps of preparing a node information signal memory which memorizes the node information signals of each node and the other nodes, initially memorizing the node information signal of each of the nodes into the node information signal memory, receiving the node information signals of the other nodes from the other nodes, and memorizing the node information signals of the other nodes into the node information signal memory.

DESCRIPTION OF THE PREFERRED EMBODIMENT

Figure 1:
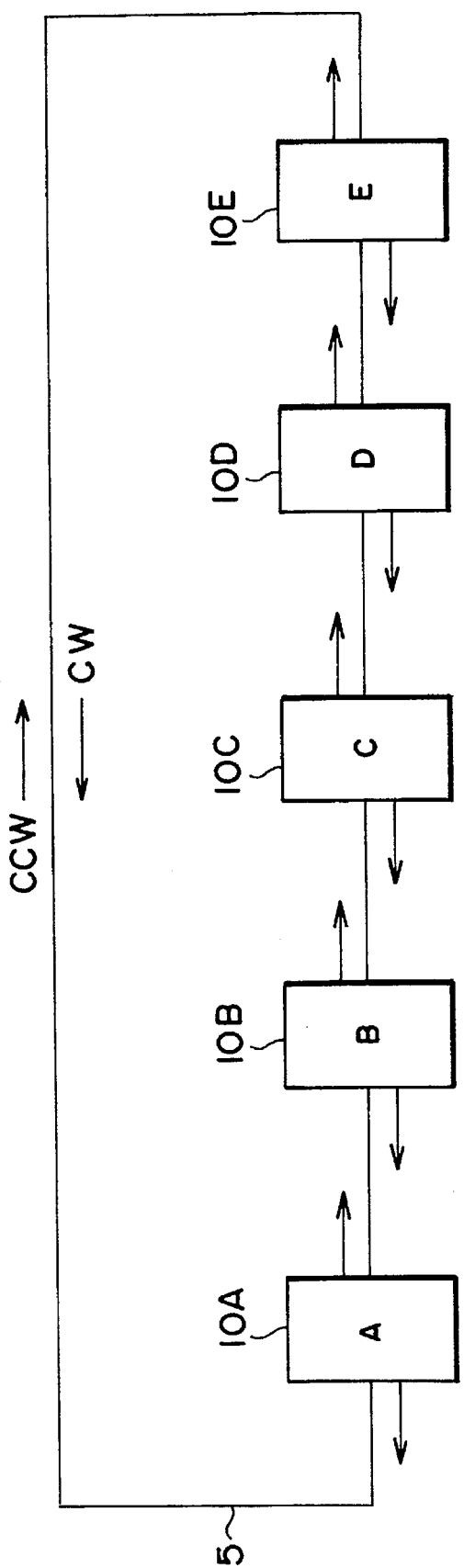
FIG. 1 is a block diagram of a ring network system according to a preferred embodiment of this invention.

Referring to FIG. 1, a ring network system according to a preferred embodiment of this invention may be assumed to be a synchronous optical network (SONET) or a synchronous digital hierarchy (SDH) ring system in the following description. In the illustrated example, the ring network system comprises five nodes which are connected to one another through a communication path 5 and which may be called first, second, third, fourth, and fifth nodes labeled 10A, 10B, 10C, 10D, and 10E, respectively. Each of the first through the fifth nodes 10A through 10E can carry out bidirectional communication along the communication path 5 in a known manner. The communication path 5 is practically structured by optical paths which are assumed to be divided into a clockwise optical path and a counterclockwise path for clockwise and counterclockwise communications symbolized by CCW and CW in FIG. 1, respectively.

Herein, it is surmised that each of the first through the fifth nodes 10A to 10E is similar in structure and operation to one another and can periodically transmit notifications in both directions along the clockwise and the counterclockwise paths, as depicted by arrows in FIG. 1. Such notifications may be node information signals each of which is representative of status of each node. In addition, it may be understood for the time being that each of the first through the fifth nodes 10A to 10E comprises a node information signal memory or table for memorizing the node information signals.

Figure 2:
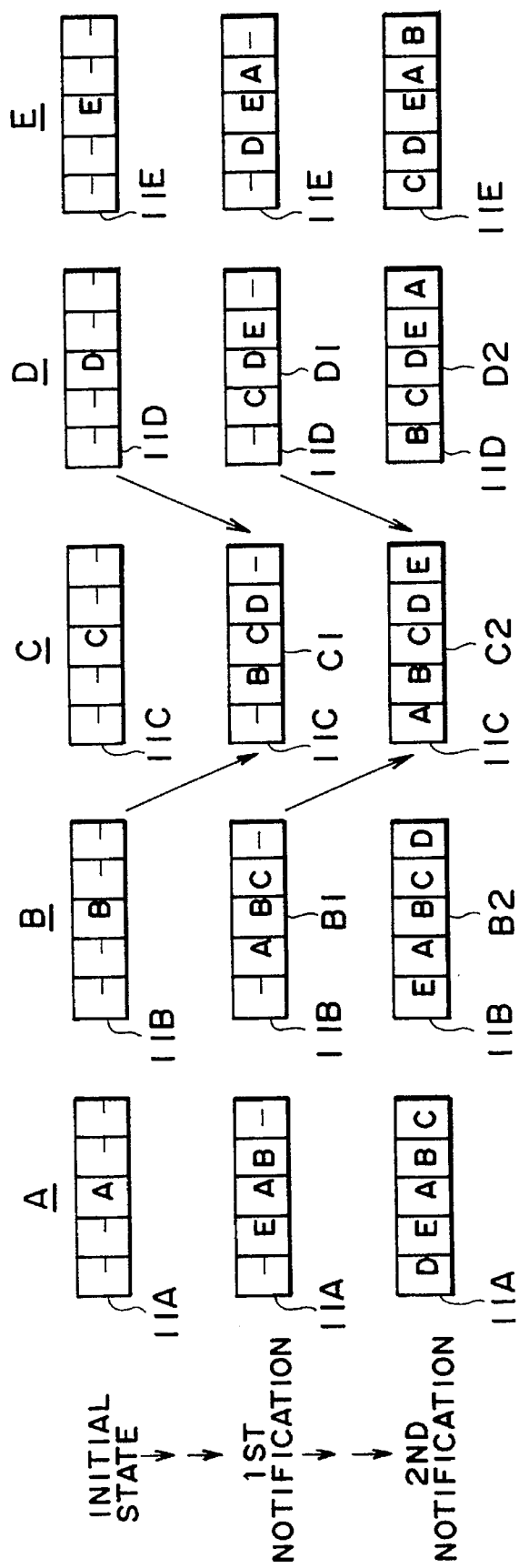
FIG. 2 is a time chart for use in describing operation of the ring network system illustrated in FIG. 1.

Referring to FIG. 2, the first through the fifth nodes 10A to 10E illustrated in FIG. 1 are specified by first through fifth ones of the node information signal memories or tables 11A, 11B, 11C, 11D, and 11E. Each of the node information signal memories 11A to 11E is divided into first through fifth memory areas assigned to the first through the fifth node information signal memories 11A to 11E. In FIG. 2, contents of the first through the fifth memory node information signal memories 11A to 11E are periodically changed or renewed from time to time in a manner illustrated in FIG. 2.

More specifically, the node information signals of the first through the fifth nodes 11A to 11E are represented by A to E in FIGS. 1 and 2, respectively. As illustrated in FIG. 2, the first through the fifth node information signal memories 11A to 11E are loaded in an initial state with their own node information signals A to E, respectively, which are memorized in a center one of the memory areas. The remaining areas of each of the first through the fifth node information signal memories 11A to 11E are put into a reset state in the initial state. Therefore, the first through the fifth node information signals A to E alone are memorized in the first through the fifth node information memories 11A to 11E in the initial state.

Herein, description will be mainly made as regards operation of the third node 10C which is located between the second and the fourth nodes 11B and 11D in order to facilitate an understanding of this invention. As shown in FIG. 2, the third node information signal C is stored in the third node information signal memory 11C in the initial state. In this initial state, the second and the fourth node information signal memories 11B and 11D are loaded with the second and the fourth node information signals B and D, respectively.

Under the circumstances, let a first notification be made between the second and the nodes 10B and 10C and between the fourth and the third nodes 10D and 10C. Herein, it is noted that the second and the fourth node information signals B and D are memorized in the initial state in the second and the fourth node information signal memories 11B and 11D, respectively, as shown in FIG. 2.

On the first notification, bidirectional communication is carried out between two adjacent ones of the nodes through the clockwise and the counterclockwise paths. As a result, the second and the fourth node information signals B and D are sent to the third node information signal memory 11C and are memorized in the areas of the third node information signal memory 11C which are assigned to the second and the fourth nodes 10B and 10D, as depicted at C1. Likewise, the second node information signal memories 11B is loaded with the first and the third node information signals A and C together with the second node information signal B, as shown at B1, while the fourth node information signal memory 11D is loaded with the third and the fourth node information signals C and D, as depicted at D1.

After completion of the first notification, the second notification is carried out in the manner mentioned in conjunction with the first notification. As to the third node information signal memory 11C, the first node information signal A is transmitted from the second node information signal memory 11B to the third node information signal memory 11C while the fifth node information signal E is transmitted from the fourth node information signal memory 11D to the third node information signal memory 11C, as depicted at C2. Thus, the third node information signal memory 11C are loaded with all of the first through the fifth node information signals A to E. Likewise, each of the first, the second, the fourth, and the fifth node information signal memories 11A, 11B, 11D, and 11E is loaded with all of the node information signals included in the ring network system, as shown FIG. 2.

In other words, all of the node information signals can be memorized in each of the first through the fifth node information signal memories 11A to 11E. This means that all of the node information signals of the first through the fifth nodes 10A to 10E can be monitored by only watching a single one of the node information signal memories 11A to 11E. From this fact, it is readily understood that each of the nodes 10A to 10E has a function of collecting the node information signals in all of the nodes included in the ring network system.

Inasmuch as each of the node information signals A to E usually includes an alarm signal representative of a state of an alarm, occurrence of an alarm can be detected by a superintendent by monitoring either one of the first through the fifth node information signal memories 11A to 11E.

Each of the first and the second notifications is periodically made by carrying out bidirectional communication between two adjacent ones of the nodes to renew or update the contents of each of the first through the fifth node information signal memories 11A to 11E.

Figure 3:
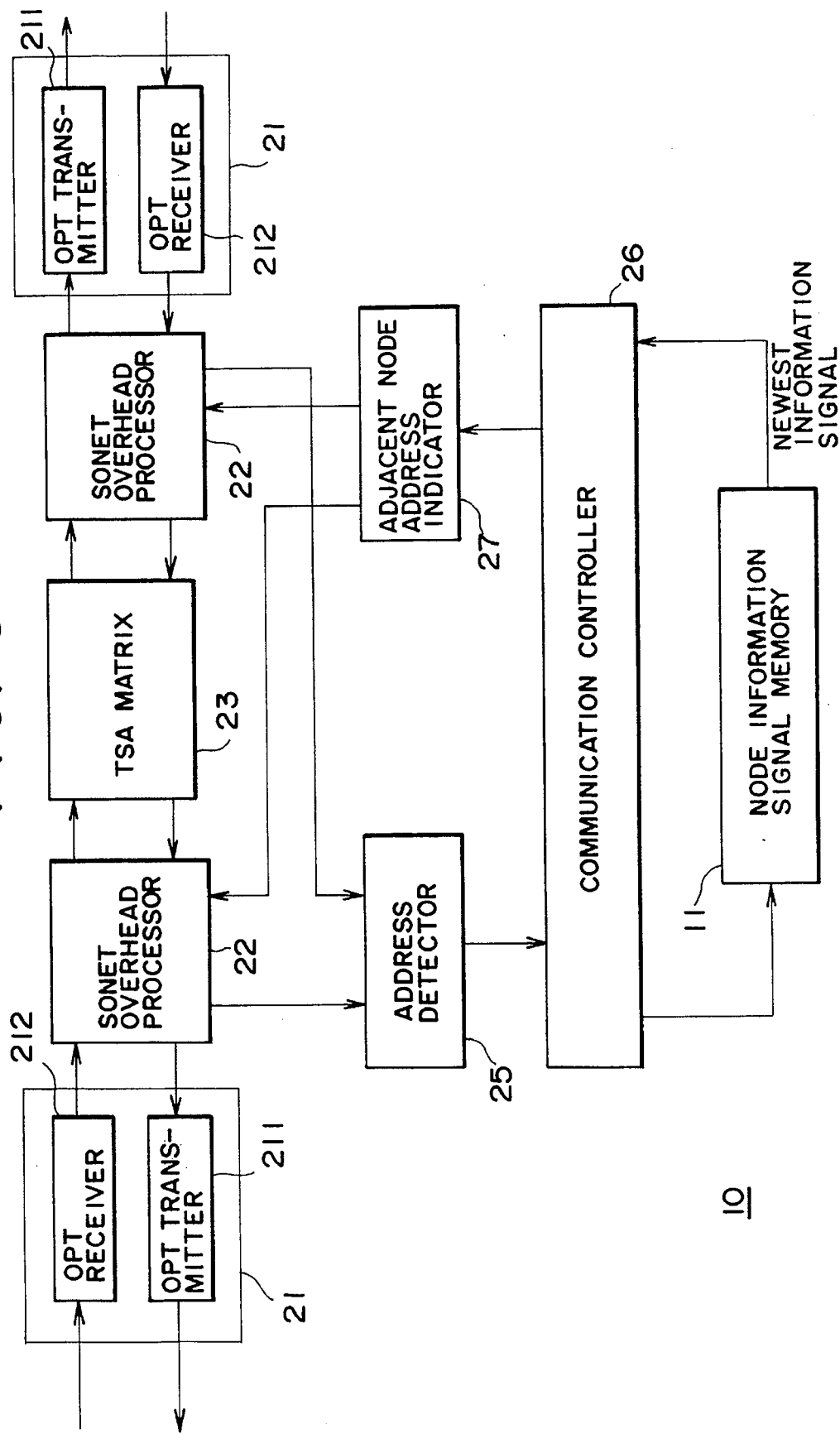
FIG. 3 is a block diagram of a node included in the ring network system illustrated in FIG. 1.

Referring to FIG. 3, each of the first through the fifth nodes 10A to 10E is similar in structure to one another, as mentioned before, and a single node alone is exemplified in FIG. 3 with suffixes A to E omitted. In FIG. 3, the illustrated node 10 comprises a pair of input/output interfaces 21 each of which is composed of an optical (OPT) transmitter 211 and an optical (OPT) receiver 212 connected to the optical paths. Each of the input/output interfaces 21 serves to transmit and receive an optical signal which is defined in the SONET. As known in the art, the optical signal includes a communication overhead for communicating with the other nodes, along with a main communication signal.

The input/output interfaces 21 are connected to SONET overhead processors 22 both of which are coupled to a TSA (Time Slot Assignment) matrix 23. With this structure, the communication overhead is detected or extracted by the SONET overhead processor 22 from a reception signal sent through each of the OPT receivers 212. After the communication overhead is processed, the main communication signal is sent to the TSA matrix 23 which is operable as ring add-drop multiplex (ADM) equipment. As a result, the main communication signal is processed in a known manner to be added or dropped and to be passed therethrough.

Subsequently, description will be directed to a processing operation of the communication overhead hereinunder. At first, let the communication overhead be received by the illustrated node 10 in the form of a packet which also includes the main information signal. The communication overhead received through the SONET overhead processor 22 is sent to an address detector 25 which detects whether or not the received communication overhead includes an address which is preassigned to the node 10 itself and which may be called a preassigned address. When the preassigned address is included in the received communication overhead, the packet in question is extracted and sent to a communication controller 26 which controls communication with an adjacent one of the nodes. The communication controller 26 also carries out formation or separation of the packet in a known manner.

As regards communication between the adjacent node and the node in question, the communication controller 26 extracts a message sent from the adjacent node, after the packet destined to the node is detected in the above-mentioned manner. If the message includes the node information signal of the adjacent node, the node information signal is delivered from the communication controller 26 to a node information signal memory 11 (affix omitted). As a result, the node information signal is renewed in the node information signal memory 11 under control of the communication controller 26. This shows that an alarm information signal is renewed or updated in the node information signal memory 11, as illustrated in FIG. 2.

On the other hand, let the node information signals be transmitted to an adjacent node. In this event, a transmission packet is formed by the communication controller 26 in response to a newest node information signal sent from the node information signal memory 11. Such a transmission packet is periodically formed by the communication controller 26 to be sent to the adjacent node. After formation of the transmission packet, a node address assigned to the adjacent node is attached to the transmission packet in an adjacent node address indicator 27. Thus, a desired packet which includes the adjacent node and the newest node information signal is completed by the adjacent node address indicator 27 and is delivered to the SONET overhead processor 22 to be converted into the optical signal defined in the SONET and to be sent to the adjacent node.

While this invention has thus far been described in conjunction with a preferred embodiment thereof, it will be readily possible for those skilled in the art to put this invention into practice in various other manners. For example, this invention is not restricted to the SONET or SDH system but is applicable to various ring network systems. In addition, unidirectional communication may be carried out so as to collect all of node information signals in each node. The ring network system may include at least two nodes between which node information signals may be transferred.

What is claimed is:

1. A ring network system comprising a plurality of nodes which are connected to one another through a ring connection, said ring network using a communication overhead to pass overhead information between nodes wherein said communication overhead is in addition to a main communication signal, each one of said nodes comprising:

node information signal producing means for producing a node information signal representative of a state of said each one of said nodes;

a node information signal memory for memorizing the node information signals of all of said nodes;

receiving means connected to said ring connection for successively receiving the node information signals of the other nodes through an adjacent one of the nodes by extracting a packet from said communication overhead; and control means for controlling said node information signals by extracting said node information signals from said packet for provision to said memory;

wherein all of said nodes are caused to memorize said node information signals of all of the nodes into respective node information signal memories.

2. The ring network system as claimed in claim 1, wherein:

each of said nodes comprises;

transmitting means connected to said ring connection for transmitting the node information signal of each of said nodes to at least one adjacent node, through the said ring connection, by inserting a packet into said communication overhead;

wherein said control means controls said transmitting means to insert said packet, said packet containing the node information signals memorized in said memory.

3. A ring network system as claimed in claim 1, wherein said node information signal includes an alarm signal representative of occurrence of an alarm in each of the nodes.

4. A ring network system as claimed in claim 1, wherein said ring-connection path is composed of bi-directional paths for bi-directional communications among said nodes.

5. A ring network system as claimed in claim 4, wherein each of said nodes is supplied with the node information signals through two of the nodes adjacent to each of said nodes to collect the node information signals in all of said nodes.

6. A ring network system as claimed in claim 5, wherein said node information signal memory of each of said memory has a plurality of memory areas which are assigned to the respective nodes to memorize the node information signals in the respective memory areas.

7. A method for use in a ring network system which comprises a plurality of nodes connected to one another through a ring connection, said method being for collecting, in each of said nodes, node information signals sent from each of said nodes via a communication overhead and comprising the steps of:

preparing a node information signal memory, in each of said nodes, which memorizes the node information signals sent from the respective nodes;

initially memorizing the node information signal of each of said nodes into the node information signal memory in each of said nodes;

receiving the node information signals of the other nodes through an adjacent one of the nodes adjacent to each of the nodes by extracting a packet from said communication overhead; and memorizing the node information signals of all of said nodes, which are extracted from said packet, into the node information signal memory in each of said nodes.

8. The method as claimed in claim 7, further comprising the step of:

transmitting the node information signal of each of said nodes to at least one of the nodes adjacent to each node via said communication overhead.

9. A method as claimed in claim 7, wherein said node information signal is specified by an alarm signal.

10. A method as claimed in claim 9, further comprising the step of:

monitoring, at each of said nodes, said node information signals memorized in said node information signal memory to detect whether or not said alarm signal is memorized in said node information signal memory.

11. An optical ring network system for use in telephony, said optical ring network system comprising a plurality of nodes which are connected to one another through a ring connection, and said optical ring network using a communication overhead to pass overhead information between nodes wherein the communication overhead is in addition to a main communication signal, each one of said nodes comprising:

node information signal producing means for producing a node information signal representative of a state of said each one of said nodes;

a node information signal memory for memorizing the node information signals of all of said nodes;

receiving means connected to said ring connection for successively receiving the node information signals of the other nodes through an adjacent one of the nodes by extracting a packet from said communication overhead; and control means for controlling said node information signals by extracting said node information signals from said packet for provision to said memory;

wherein all of said nodes are caused to memorize said node information signals of all of the nodes into respective node information signal memories.

12. The ring network system as claimed in claim 11, wherein:

each of said nodes comprises;

transmitting means connected to said ring connection for transmitting the node information signal of each of said nodes to at least one adjacent node, through the said ring connection, by inserting a packet into the communication overhead;

wherein said control means controls said transmitting means to insert said packet, said packet containing the node information signals memorized in said memory.

13. The ring network system as claimed in claim 11, wherein said node information signal includes an alarm signal representative of occurrence of an alarm in each of the nodes.

14. The ring network system as claimed in claim 11, wherein said ring connection is composed of bi-directional paths for bi-directional communications among said nodes.

15. The ring network system as claimed in claim 14, wherein each of said nodes is supplied with the node information signals through two ones of the nodes adjacent to each of said nodes to collect the node information signals in all of said nodes.

16. The ring network system as claimed in claim 15, wherein said node information signal memory of each of said memory has a plurality of memory areas which are assigned to the respective nodes to memorize the node information signals in the respective memory areas.

17. A method for use in an optical ring network telephony system which comprises a plurality of nodes connected to one another through a ring connection, said method being for collecting, in each of said nodes, node information signals sent from each of said nodes via a communication overhead and comprising the steps of:

preparing a node information signal memory, in each of said nodes, which memorizes the node information signals sent from the respective nodes;

initially memorizing the node information signal of each of said nodes into the node information signal memory in each of said nodes;

receiving the node information signals of the other nodes through an adjacent one of the nodes adjacent to each of the nodes by extracting a packet from the communication overhead; and memorizing the node information signals of all said nodes, which are extracted from said packet, into the node information signal memory in each of said nodes.

18. The method as claimed in claim 17, further comprising the step of:

transmitting the node information signal of each of said nodes to at least one of the nodes adjacent to each node via the communication overhead.

19. The method as claimed in claim 17, wherein said node information signal is specified by an alarm signal.

20. The method as claimed in claim 19, further comprising the step of:

monitoring, in each of said nodes, said node information signals memorized in said node information signal memory to detect whether or not said alarm signal is memorized in said node information signal memory.

* * * * *